H. W. SMITH.
Reed-Organ.
No. 8,516. Reissued Dec. 10, 1878.
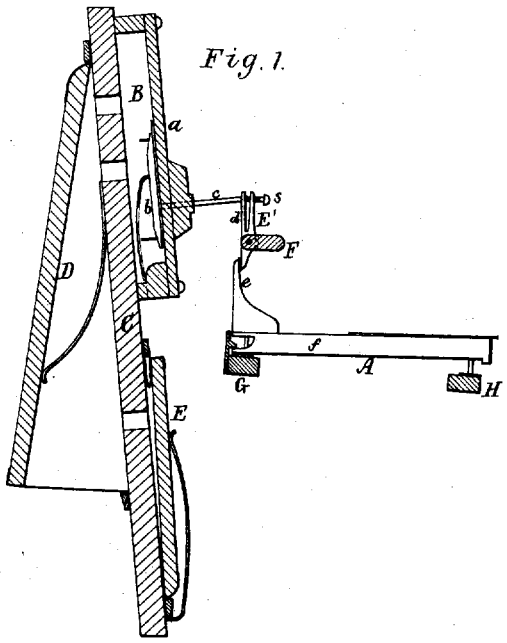
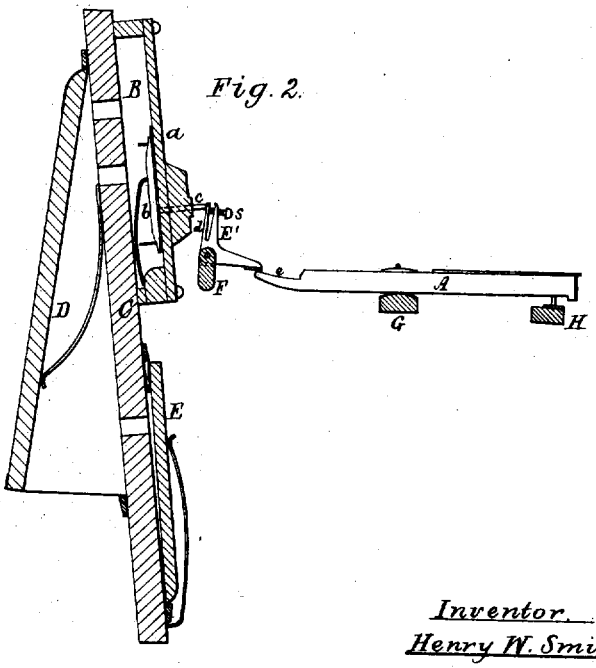
Witnesses.
S. N. Pipes
Wm. L. Evans
Inventor.
Henry W. Smith.
by his attorney
R. H. Eddy
N. PETERS, PHOTO-LITHOGRAPHER, WASHINGTON, D. C.

UNITED STATES PATENT OFFICE.

HENRY W. SMITH, OF WEST NEWTON, MASSACHUSETTS.

IMPROVEMENT IN REED-ORGANS.

Specification forming part of Letters Patent No. 205,917, dated July 9, 1878; Reissue No. 8,516, dated December 10, 1878; application filed September 28, 1878.

*To all whom it may concern:*

Be it known that I, HENRY W. SMITH, of West Newton, of the county of Middlesex, of the State of Massachusetts, have invented a new and useful Improvement in Reed-Organs; and do hereby declare the same to be described in the following specification and represented in the accompanying drawings, of which—

Figures 1 and 2 are vertical sections of a reed-organ embracing my invention, and exhibit it under two different constructions.

In carrying out my invention, I have arranged the reed-board and its valve above, and at or about at a right angle with, the key, and combined with each reed-valve, its push-pin, and key an auxiliary or short lever, having its upper arm provided with an elastic tongue and an adjusting-screw, such tongue and screw being for the adjustment of the key with reference to that or those next it of the series or bank, while the auxiliary lever is to enable the key, when struck, to effect the forcing of the reed-valve off its seat. The upper or back fly of the bellows is pivoted at top to the intermediate or fly-support board of the bellows, and extends above the key and below it and the reed-board.

In the drawings, A denotes the key; B, the wind-chest, and C the intermediate or support board of the two movable flies D E of the bellows.

Furthermore, the lower fly of the bellows extends back of and below the key. My arrangement of the key, wind-chest, bellows, fly-support board, and the two flies thereof enables me to produce a very compact instrument, with its operative parts readily accessible, whether for repair or adjustment.

The reed-board *a* has the valve *b* and its push-pin *c* applied to it in the usual way, they being arranged as represented. The push-pin, at its outer end, abuts against the elastic tongue *d* of the lever E′, disposed as shown, and having its lever-arm lapped on the rear arm, *e*, of the key.

In Fig. 1 the said rear arm, *e*, is shown as placed at a right angle with the front arm or part, *f*, of the key, while in Fig. 2 both arms of the key are in line with each other. In Fig. 1 the lever E′ is shown as what is termed a "straight lever," whereas in Fig. 2 it is exhibited as what is termed a "knee-lever."

There is screwed through the upper arm of the lever E′, and against the tongue *d*, an adjusting-screw, *s*, by which the said tongue may be forced away from the arm more or less, as may be necessary to bring the key level with the others of the series whenever it may be desirable to effect such an adjustment of it. In each of the figures the lever E′ is shown as pivoted to a rail, F, arranged as represented.

On the key being struck the lever E′ will be moved so as to force in the push-pin and cause it to press the reed-valve off its seat.

The pivotal bar of the key is shown at G, and the rest-bar at H, such bars being properly cushioned.

From the above it will be seen that the reed-board *a* and its valve, by being arranged above and at or about at a right angle to the key, enables a person to more readily gain access to the reed, for its removal or other purpose, than would be the case were the reed-board horizontal and below the key.

Furthermore, the said arrangement of the reed-board and valve upright, or nearly so, and above the key, coupled with the arrangement of the lever E′, as represented, also is advantageous in enabling access to be readily had to the lever and its screw *s*, as occasion may require. The arrangement, besides, enables the organ to be constructed of less depth in range of the key than would be the case were the key parallel to and extended in rear of the reed-board. The arrangement of the fly D with respect to the reed-board and key is also productive of advantage.

In a reed-organ, I claim as my invention as follows, viz:

1. The reed-board and its valve, arranged above and at or about at a right angle with the key, in combination with the bellows-board C and the two flies D E, arranged with the key, substantially as represented.

2. The key A, lever E′, push-pin *c*, reed-board *a*, valve *b*, wind-chest B, bellows-board C, and the two flies D E, combined and arranged substantially as shown and described.

3. The lever E′, provided with the tongue

*d* and the adjusting-screw *s*, combined and arranged with the reed-valve *b*, push-pin *c*, and the key A, substantially as and for the purposes set forth.

4. The lever E′, arranged and combined with the reed-valve *b*, push-pin *c*, and the key A, all being essentially as shown, and to enable the push-pin to be moved in by such lever on the key being struck.

5. In combination with the reed-board and its valve, arranged with the key, as shown, the fly or bellows board D, pivoted at top to the board C, and arranged as represented, so as to project above the key and below it and the reed-board, as set forth.

HENRY W. SMITH.

Witnesses:
R. H. EDDY,
S. N. PIPER.